United States Patent [19]

Zeigler et al.

[11] 4,109,830
[45] Aug. 29, 1978

[54] TILTABLE TRAP CHAMBER WITH STACK AIDING FEATURE

[76] Inventors: James Richard Zeigler, 245 W. 107th St., New York, N.Y. 10025; Daniel S. Sauter, 19 Fairview Ave., Montvale, N.J. 07645

[21] Appl. No.: 785,198

[22] Filed: Apr. 6, 1977

[51] Int. Cl.² ........................................... G01F 11/28
[52] U.S. Cl. .................................... 222/143; 222/158; 222/454
[58] Field of Search ...................... 141/319, 320, 321; 222/143, 158, 437, 454, 455, 456, 457

[56] References Cited

U.S. PATENT DOCUMENTS

| | | | |
|---|---|---|---|
| 1,093,740 | 4/1914 | Stevenson | 222/158 |
| 1,540,122 | 6/1925 | Harder | 222/456 |
| 2,190,092 | 2/1940 | Bailey | 222/456 X |
| 2,426,119 | 8/1947 | Partin | 222/457 |
| 2,980,297 | 4/1961 | Tucci | 222/456 UX |
| 3,680,744 | 8/1972 | Daniels, Jr. | 222/454 X |
| 3,837,535 | 9/1974 | Gerk | 222/143 |

*Primary Examiner*—Robert B. Reeves
*Assistant Examiner*—David A. Scherbel
*Attorney, Agent, or Firm*—Larson, Taylor and Hinds

[57] ABSTRACT

An apparatus is provided for measuring and dispensing material from a conventional container having a mouth. The apparatus comprises a measuring receptacle and compatible threads for securing the receptacle to the container, the securing threads acting to seal the mouth of the container. The measuring receptacle includes a lower wall, an upper wall, and a plurality of side walls. The upper wall has a transparent portion with measurement indicia provided thereon. The lower wall has a charging port provided therein for providing communication with the container. The measuring receptacle also includes a discharging port provided in one of said side walls, which side wall is spaced from said measurement indicia. Also the apparatus includes a cap for sealingly closing the discharging port. Further, a method is provided for measuring and dispensing material from a conventional container with the above disclosed apparatus, wherein the method includes the steps of securing the apparatus to the mouth of the container, and then tilting the container so that the discharging port points upwardly. The method further includes the steps of allowing material to flow from the container through the charging port into the measuring receptacle, filling the measuring receptacle to a preselected measurement indicia, and rotating the container so that the material falls through the discharging port.

1 Claim, 6 Drawing Figures

TILTABLE TRAP CHAMBER WITH STACK AIDING FEATURE

BACKGROUND OF THE INVENTION

1. Field of the Invention

This invention relates to an apparatus for dispensing material from a container, and in particular to an apparatus for dispensing a measured amount of material from the container.

2. Description of the Prior Art

Several prior art devices are currently available for dispensing material from a container. Among these are devices including a receptacle for receiving and measuring material from the container, which receptacle is sealingly mounted over the mouth of the receptacle. The receptacles have measurement indicia provided thereon for measuring an amount of material to be dispensed. Such prior art devices are disclosed, for example, in U.S. Pat. Nos. 2,800,257 (Nixon) and 3,512,681 (Frankel). These devices generally have several disadvantages which can include, for example, a complex structure including protruding parts that can be easily broken, or removable parts that can be inadvertently thrown away, a multi-step operating procedure, and the possibility of malfunction. Expanding on the former disadvantage, the Nixon patent discloses an intricately designed dispensing device that includes an elongate handle secured to a sealing disc, which handle withdraws the disc from a measuring receptacle to facilitate the preselection of an amount of material to be dispensed. Not only would the elongate handle, as it is unprotected, be susceptable to breakage, but additionally, as the preselection is effected by moving a disc relative to the receptable, malfunctions are inherent. The Frankel patent discloses a measuring receptacle mounted to a container, the receptacle including a remountable cap which must be positioned to effect measurement of the material to be dispensed and must be then completely removed to effect dispensing. Thus the possibility that the cap can be displaced is ever present. Further, moveable parts are required to seal a discharge port that provides communication between the container and the measuring receptacle, when dispensing from the measuring receptacle is effected. Again the possibility of malfunction exists. A further disadvantage is that some of these devices are not designed to allow the containers with the devices secured thereto to be stacked for easy storage or transportation.

Other prior art dispensing devices are adapted to dispense only one preselected amount of material. As is inherently obvious, a plurality of devices would be needed to provide a range of preselected amounts for dispensing, such a range would certainly be helpful in many dispensing applications. Such prior art devices are disclosed, for example, in U.S. Pat. Nos. 2,190,092 (Bailey), 2,538,336 (Smith), and 3,680,744 (Daniels).

SUMMARY OF THE INVENTION

In accordance with the present invention, a dispensing apparatus is provided that overcomes the disadvantages associated with prior art. According to a preferred embodiment of the invention, there is provided an apparatus for measuring and dispensing material from a conventional container having a mouth, wherein the apparatus comprises a measuring receptacle and means for securing the receptacle to the container, which means includes further means for sealing the mouth of the container. The measuring receptacle includes a lower wall, an upper wall, and a plurality of side walls. The upper wall includes a transparent portion having measuring indicia provided thereon. The lower wall has a charging port provided therein for providing communication with the conventional container. The measuring receptacle also includes a discharging port provided in one of the side walls, which side wall is spaced from the measurement indicia.

An aspect of the invention includes a cap for sealingly closing the discharging port.

Further, in a preferred embodiment the measuring receptacle can include an elongated cylinder or an elongated parallelepiped having a discharging port at one end thereof, the measurement indicia being spaced distally therefrom.

A further aspect of the invention includes support pedestals for allowing one container to be stacked upon another container.

The invention further includes a method for measuring and dispensing material from a conventional container having a mouth with an apparatus of the invention mounted thereover, wherein the method comprises the steps of securing the apparatus to the mouth of the container, tilting the container so that the discharging port points upwardly, and allowing material to flow from the container through the charging port into the measuring receptacle. The method includes the further steps of filling the measuring receptacle to a preselected measurement indicia and rotating the container so that the material falls through the discharging port.

Unlike the prior art devices, the apparatus of the invention is of simple construction and includes no moving parts that can malfunction. The cap of the invention is not required for the dispensing operation and can be disposed of, if desired, preparatory to the initial use of the apparatus, unless of, course, it is desirable to reseal the apparatus in order to preserve the freshness of and/or prevent contamination of the material. Further, as one or more measurement indicia can be provided on the measuring receptacle of the invention, a range of differing amounts of materials can be dispensed from the apparatus. Though inherent, it is further noted that material can be removed from the container without removing the apparatus of the invention, in contrast to the necessity of removing a conventional top to remove material from a conventional container. Also, no external measuring instrument, such as a spoon, is required in order to dispense a measured amount of material.

Additional features and advantages of the invention will be set forth in, or apparent from, the detailed description of a preferred embodiment found hereinbelow.

DETAILED DESCRIPTION OF THE PREFERRED EMBODIMENT

Figure 1:
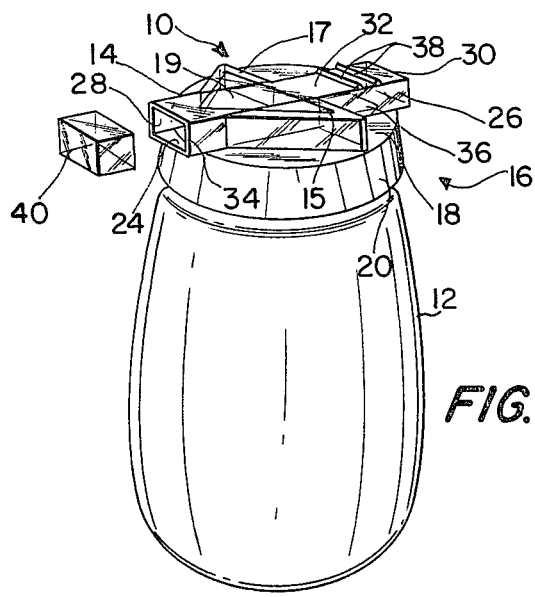
FIG. 1 depicts a perspective view of the apparatus of the invention, mounted on top of a conventional container.
Figure 2:
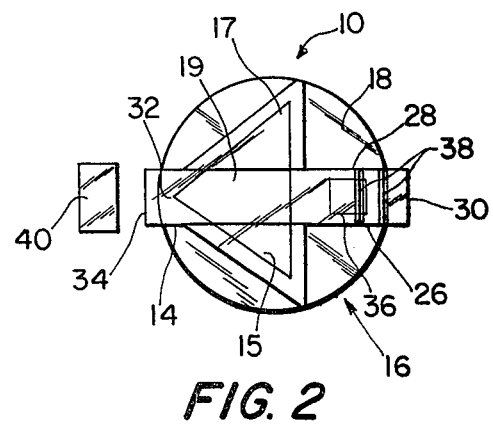
FIG. 2 depicts a top view of the apparatus of the invention in FIG. 1.
Figure 6:
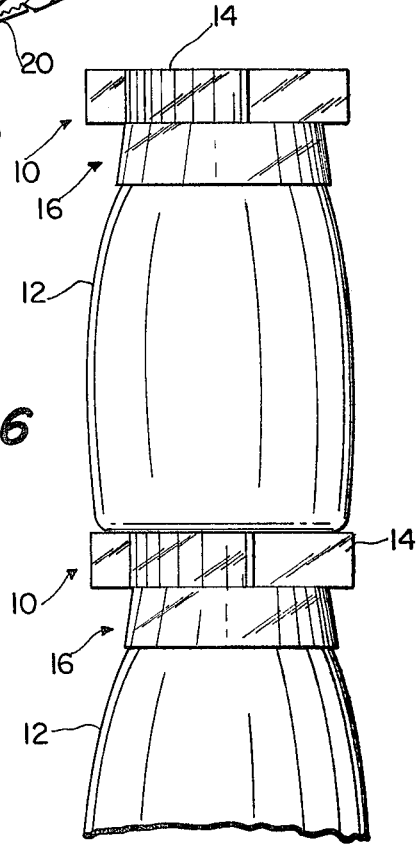
FIG. 6 depicts an elevational view of one container with an apparatus of the invention secured thereto stacked upon another similar apparatus of the invention which apparatus is secured to a partially cut-away container.

With reference to the drawings, and in particular to FIG. 1, there is depicted an apparatus of the invention, which is generally denoted 10 and which is mounted on top of a conventional container 12. Container 12 includes a mouth including threads 13 provided circumferentially thereabout (see FIG. 3). Apparatus 10 includes an elongate, and hollow, parallelepiped shaped measuring receptacle 14, flanked on either side thereof by prismatic support pedestals 15 and 17, which receptacle 14 and pedestals 15 and 17 are integrally molded with, and upstanding from, a top 16, which top 16 is similar in construction to, for example, a conventional top used to seal the mouth of a conventional container such as container 12. As viewed in FIG. 2, elongate receptacle 14 and support pedestals 15 and 17 provide a planar, upper support surface 19 which has the general shape of an arrow and which can stably support another container placed thereupon as depicted in FIG. 6. It is further noted that each end of receptacle 14 extends beyond the peripheral edge of top 16.

Top 16 includes a generally planar and circular shaped member 18 (FIGS. 1 and 2) and a generally cylindrical skirt 20 downwardly dependent therefrom. The inner surface of cylindrical skirt 20 is provided with circumferential threads 22 (FIG. 3), which threads 22 are compatable with, and sealingly mates with, threads 13 of container 12.

Measuring receptacle 14 includes a lower wall member 24 (FIGS. 1 and 3) which is generally rectangular in shape and comprises a portion of planar member 18. Receptacle 14 further includes elongate, rectangular side wall members 26 and 28 (FIGS. 1 and 2) and rectangular end wall member 30, which wall members are upstanding from lower wall member 24. Receptacle 14 includes upper rectangular wall member 32, member 32 having an upper surface which comprises a portion of arrow-shaped upper planar support surface 19. A charging port 36 is provided through lower wall member 24, which charging port provides communication between container 12 and measuring receptacle 14. Charging port 36 is located generally adjacent end wall member 30. Further, a discharging port 34 is provided through the end of receptacle 14 located distally from end wall 26.

Located on the outer surface of upper wall member 32, generally above charging port 36, are two elongate prismatically-shaped measurement indicia 38, which indicia 38 are integrally molded with receptacle 14. Also, apparatus 10 further includes a cap 40 (FIGS. 1 and 2) adapted to slide over the end of receptacle 14, having discharge port 34 provided therein so as to sealingly close discharge port 34.

In a preferred embodiment apparatus 10 is molded from transparent, tough, break-resistant plastic material. However, it is to be noted that at least the portion of upper wall member 32 located under measurement indicia 38 is to be transparent so that material, generally denoted 42 (FIGS. 3, 4 and 5), stored in container 12 can be viewed through wall 32 in the area of indicia 38. It is further noted that material 42 can include such material as, for example, sugar, and instant coffee. Also for purposes of identification and advertising, a label (not shown) can be applied to the upper plastic support surface 19 of pedestals 15 and 16 and the adjoining portion of upper wall 32 without interfering with measurement indicia 38.

Figure 3:
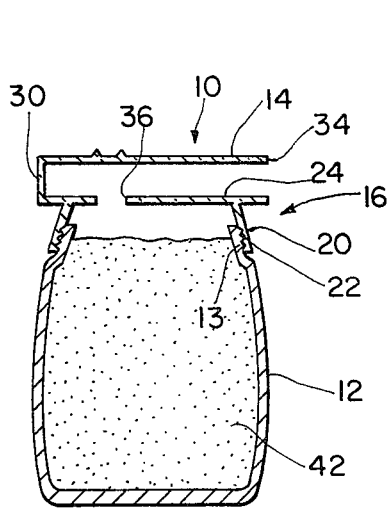
FIGS. 3, 4 and 5 depict a cross-sectional view of the apparatus of the invention and the container in sequential positions for effecting dispensing.
Figure 4:
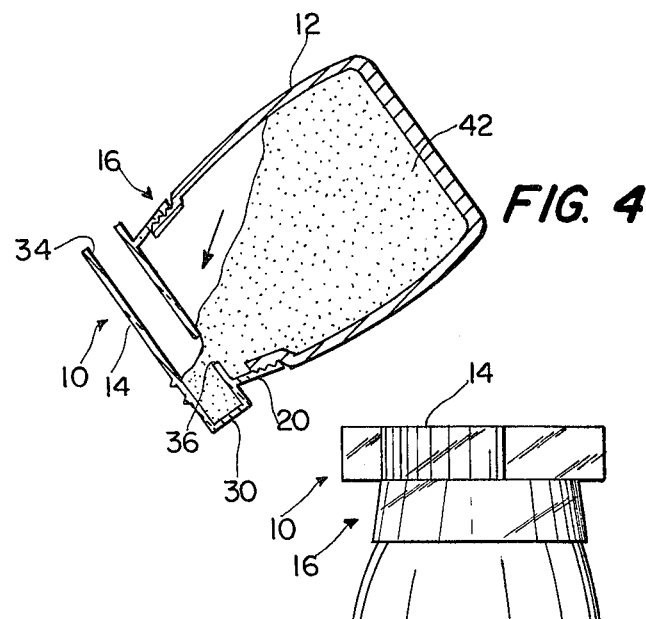
Figure 5:
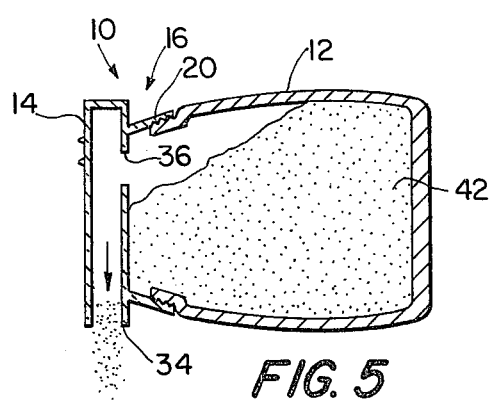

The operation of measuring and dispensing of apparatus 10 is as follows. Apparatus 10 is mounted to container 12 and stored in an upright position as depicted in FIG. 3. In order to measure an amount of material, container 12 is tipped (FIG. 4) to about 135° from the vertical position of FIG. 3, such that discharge port 34 points generally upward. Container 12 is then gently shaken so that material 42 is dispensed from container 12 (see arrow FIG. 4) through charging port 36 into receptacle 14. When receptacle 14 has been filled up to a desired level as measured by indicia 38, container 12 is then rotated to the position as depicted in FIG. 5 such that dispensing port 34 is orientated downwardly, thereby dispensing material 42 from receptacle 14 (see arrow).

An alternate embodiment of the dispensing measuring apparatus of the invention includes a cylindrical measuring receptacle instead of receptacle 14 of FIG. 1. This embodiment has a cross-section essentially similar to that depicted in FIGS. 3, 4 and 5.

Although the present invention has been described relative to an exemplary embodiment thereof, it will be understood by those of ordinary skill in the art that variations and modifications may be effected within the scope and spirit of the invention.

We claim:

1. A measuring dispenser comprising,
    a container, and
    a top for said container,
    said top comprising a cover for the mouth of said container and having a threaded flange for securing the top to the container,
    a measuring and dispensing means on said top comprising an upper wall and side walls and together with the cover of said container top forming a generally rectangular shaped receptacle having a closed end with one end thereof open to form a discharge port,
    at least a portion of the upper wall of said measuring means being transparent and having measuring indicia thereon,
    a charging port in said cover spaced inwardly, from the peripheral edge of the mouth of the container and said charging port being relatively small in relation to the size of the mouth of the container,
    said charging port being disposed within that portion of the cover forming the rectangular shaped measuring and dispensing receptacle and being spaced from the closed end of said receptacle to form a measuring volume of said receptacle between the closed end and the charging port,
    supporting members on said top extending outwardly from the receptacle, across the cover and being of the same height as the receptacle for providing a flat surface whereby measuring dispensers may be supported in stacked relation,
    wherein the material is dispensed from the container through said apparatus by initially tilting the container so that said discharge port points upwardly and material is allowed to flow from the container through said charging port into said measuring volume of said receptacle until the material fills said measuring volume up to a preselected indicia, and then rotating the container so that the measured material falls through said discharge port.

* * * * *